United States Patent [19]

Harder et al.

[11] 4,452,752

[45] Jun. 5, 1984

[54] METHOD AND APPARATUS FOR EXTRUDING THERMOPLASTIC SHAPE

[75] Inventors: Joseph R. Harder; James E. Keesling, both of Bartlesville, Okla.

[73] Assignee: Phillips Petroleum Company, Bartlesville, Okla.

[21] Appl. No.: 339,228

[22] Filed: Jan. 13, 1982

[51] Int. Cl.³ .............................................. B29D 7/20
[52] U.S. Cl. ................................. 264/555; 264/237; 264/248; 264/557; 264/571; 425/325; 425/388
[58] Field of Search ............... 264/237, 348, 555, 557, 264/562, 571; 425/325, 388

[56] References Cited

U.S. PATENT DOCUMENTS

| | | | |
|---|---|---|---|
| Re. 23,171 | 11/1949 | Backland | 18/19 |
| 2,814,071 | 11/1957 | Allan et al. | 18/14 |
| 3,169,272 | 2/1965 | Maxson | 18/14 |
| 3,226,457 | 12/1965 | Smith, Jr. | 264/555 |
| 3,296,661 | 1/1967 | Moustier | 425/388 |
| 3,473,194 | 10/1969 | Farrow | 264/562 |
| 3,507,939 | 4/1970 | Williams et al. | 264/40 |
| 3,538,210 | 11/1970 | Gatto | 264/562 |
| 3,966,383 | 6/1976 | Bussey, Jr. | 264/555 |
| 4,340,340 | 7/1982 | Brown et al. | 264/562 |

FOREIGN PATENT DOCUMENTS 56-5179  2/1981  Japan .

Primary Examiner—Donald E. Czaja
Assistant Examiner—W. Thompson

[57] ABSTRACT

A method and apparatus for continuously cooling a thermoplastic shape having two open sides in which the thermoplastic shape, in its at least partially molten state, is extruded and/or drawn along an elongated form having a contour complimentary to the contour of one side of the two open sides and, simultaneously with moving the thermoplastic shape, at least partially cooling the thermoplastic shape by cooling the form with a liquid cooling medium and drawing a vacuum, on the previously mentioned one side of the two open sides of the thermoplastic shape, through the form.

10 Claims, 3 Drawing Figures

METHOD AND APPARATUS FOR EXTRUDING THERMOPLASTIC SHAPE

BACKGROUND OF THE INVENTION

The present invention relates to a method and apparatus for cooling a thermoplastic shape. More specifically, the present invention relates to a method of continuously cooling a thermoplastic shape having two open sides.

It is well known in the art to form thermoplastic pipe by drawing or extruding molten thermoplastic through an annular space formed between an inner male element or mandrel and an outer female element, bushing or sizing ring, while simultaneously cooling the thermoplastic to solidify the same. While dies of this type accurately form the inner and outer surfaces of the pipe and form a controlled uniform thickness, even though the thermoplastic may have a tendency to warp and shrink, there are numerous disadvantages to their use. A major disadvantage is that the dies are extremely complex and expensive. Since a given die generally forms only one size and thickness of pipe, in many cases the dies are shipped from one plant to another in order to avoid the expense of buying duplicate dies for each manufacturing facility. An attendant problem, again leading to complexity and expense, is the necessity of providing uniform cooling of the thermoplastic. Finally, since pipe is usually utilized for transporting fluids under pressure, it must have specified and uniform pressure rating and, hence, the wall thickness is maintained within a close tolerance, consequently, the dies utilized are incapable of producing pipe which varies in thickness along its length.

Since the drawing or extrusion of thermoplastic shapes other than pipe and having two open sides, such as channel shapes, is less widely practiced than the formation of pipe, little attention has been directed to improvements in the forming devices, even though the formation of such differing shapes creates numerous additional problems not encountered in the formation of pipe. Consequently, in many instances dies of the same character as those utilized in the formation of pipe are also utilized in the formation of thermoplastic shaped items having two open sides. Obviously, the wide variety of shapes with two open sides which can be and are formed greatly exaggerates the problem of utilizing complex and expensive forming equipment. In addition, there are times when it is desired to form a single elongated thermoplastic shape whose thickness varies along its length. This, of course, is impossile when utilizine pipe-type dies which surround the entire cross section of the shaped item. The desire to form an item which varies in thickness along its length also exaggerates the problem of cooling, since changing to a different thickness obviously requires changing the degree of cooling. Accordingly, there have been some attempts to simplify dies or means for forming thermoplastic shapes having two open sides. However, while these attempts have either completely or partially solved some of the above-mentioned problems, they have by no means solved all problems mentioned. Further, these more simplified methods are generally incapable of forming thermoplastic shapes having two open sides from thermoplastics which have a tendency to warp or shrink.

It is, therefore, an object of the present invention to overcome the above-mentioned and other problems of the prior art. Another object of the present invention is to provide an improved method and apparatus for continuously forming thermoplastic shapes having two open sides. Another further object of the present invention is to provide an improved method and apparatus for continuously forming thermoplastic shapes having two open sides which are inexpensive both as to method and equipment. A further object of the present invention is to provide an improved method and apparatus for forming thermoplastic shapes having two open sides which involves the utilization of improved cooling means. A still further object of the invention is to provide an improved method and apparatus for forming thermoplastic shapes having two open sides which can be varied in thickness along their length. Another and further object of the present invention is to provide a method and apparatus for forming thermoplastic shapes, having two open sides and which vary in thickness along their length, in which the cooling may be adjusted to compensate for the changes in cooling required by changes in thickness. Yet another object of the present invention is to provide an improved method and apparatus capable of accurately forming thermoplastic shapes having two open sides from thermoplastics which have a tendency to warp and shirnk. These and other objects of the present invention will be apparent from the following description.

SUMMARY OF THE INVENTION

In accordance with the present invention, a method and apparatus is provided for continuously forming a thermoplastic shape having two open sides in which the thermoplastic shape, in at least a partial molten condition, is moved across a form having a contour complimentary to the contour of one side of the two open sides and, simultaneously with the movement of the thermoplastic shape, the thermoplastic shape is cooled by cooling the form with a liquid cooling medium and drawing a vacuum on the one side of the two open sides of the thermoplastic shape through the form.

DESCRIPTION OF THE PREFERRED EMBODIMENTS

While the description herein illustrates the invention by reference to a particular thermoplastic shape which can be formed in accordance with the present invention, it is to be understood that the term, "thermoplastic shape having two open sides," is meant to include any elongated shape having an open cross sectional form with all sides open, as opposed to a closed cross sectional form, such as pipe, having inside and outside surfaces.

Figure 1:
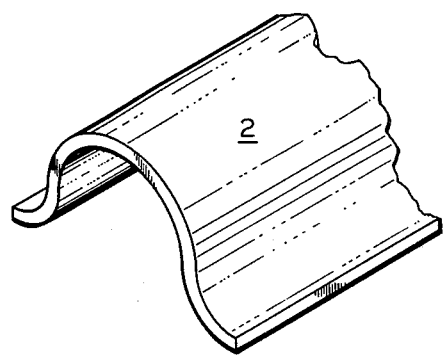
FIG. 1 of the drawings is an isometric view of one thermoplastic shape which may be formed in accordance with the present invention.

FIG. 1 of the drawings shows one such thermoplastic shape 2 having two open sides, in this particular case being a channel-type shape. Obviously, in accordance with the definition herein, other thermoplastic shapes having two open sides could include flat bar, v-shaped configurations, t-shaped configurations and similar other configurations which would be apparent to one skilled in the art.

Figure 2:
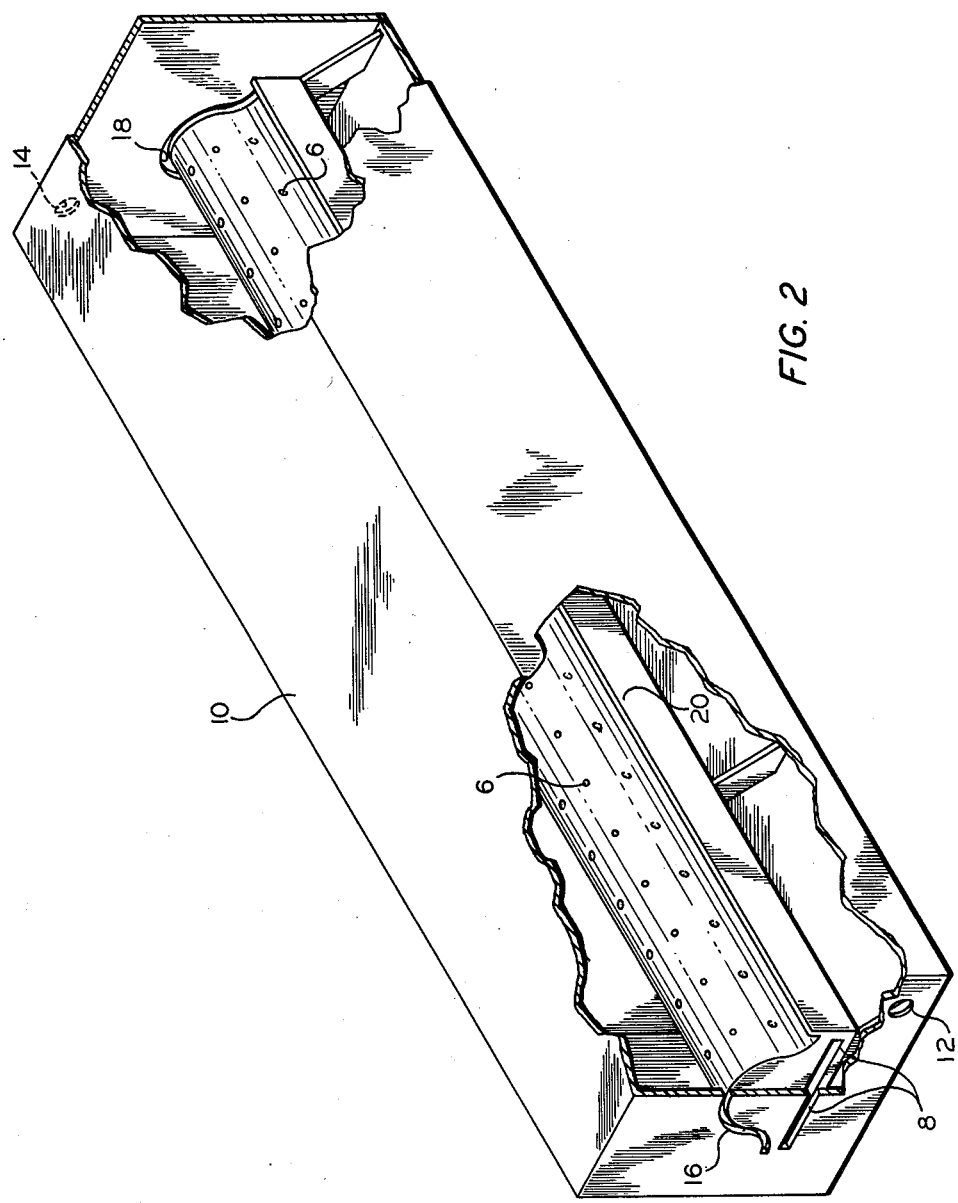
FIG. 2 is an isometric view, partially in section, showing one means for forming a thermoplastic shape in accordance with the present invention.

FIG. 2. of the drawings is an isometric view partially in section and shows one embodiment of a means for forming a thermoplastic shape having two open sides in accordance with the present invention. Specifically, in FIG. 2, the numeral 4 designates a form across which a thermoplastic shape, in its at least partially molten condition, is continuously moved by drawing and/or extrusion from an appropriate profile die and sizing sleeve. The top surface of form 4 has a contour complimentary to the contour of one side, in this particular instance the underside, of the thermoplastic shape 2 of FIG. 1. Passing through the upper surface of form 4 into the interior of form 4 are apertures 6 designed for the passage of air therethrough. Apertures 6 are in turn internally connected to channel 8, which is an open channel extending substantially the entire length of form 4. Not shown is a fixture connecting to the front end of channel 8 through which a vacuum may be drawn by an appropriate vacuum means (not shown). Otherwise, form 4 is solid. Form 4 can be made of an appropriate material, such as aluminum. Form 4 is appropriately mounted within a container 10 adapted to maintain a body of a cooling medium, such as water, on all sides of form 4. Preferably, the water is continuously circulated through water bath 10, through water inlet 12 and through water outlet 14. The plastic shape to be formed, in at least a partial molten state is continuously drawn over the top surface of form 4 through appropriate inlets and outlets 16 and 18 in the ends of water bath 10. Since water bath 10 is filled with water, openings 16 and 18 will, of course, generally conform to the upper surface or contour of thermoplastic shape 2 of FIG. 1. Form 4 may also be provided with appropriate upstanding sides 20 to form the edges of thermoplastic shape 2 of FIG. 1. While as indicated above, the openings 16 and 18 are of the general configuration of the upper surface of thermoplastic shape 2 of FIG. 1, these openings do not in and of themselves, have a direct bearing on the shape of the upper contour of thermoplastic shape 2 of FIG. 1. Instead, the vacuum drawn through form 4 draws the thermoplastic shape against the top surface of form 4 and contributes to the formation of the upper contour of thermoplastic shape 2 of FIG. 1. Drawing a vacuum on form 4 also has the very distinct advantage of preventing warping and excessive shrinkage of the thermoplastic shape as it is being formed and cooled. This is particularly important where the thermoplastic shape is to be formed from a thermoplastic which is very sensitive to warping and shrinkage, such as high density polyethylene. The vacuum may also be utilized to aid in the cooling of the thermoplastic shape by withdrawing heat through the air apertures and channel. It is also possible, in accordance with the embodiment shown, to vary or change cooling along the length of the form by appropriately tapping into air channel 8 along the length of the form and/or tapping into the water bath at appropriate points along the length of the water bath and circulating water, or other cooling medium, at different temperatures. The thickness of the thermoplastic shape can also be varied utilizing the forming means of FIG. 2 by providing slide means (not shown) at each end of water bath 10 to permit adjustment of the inlets and outlet openings 16 and 18, respectively.

Figure 3:
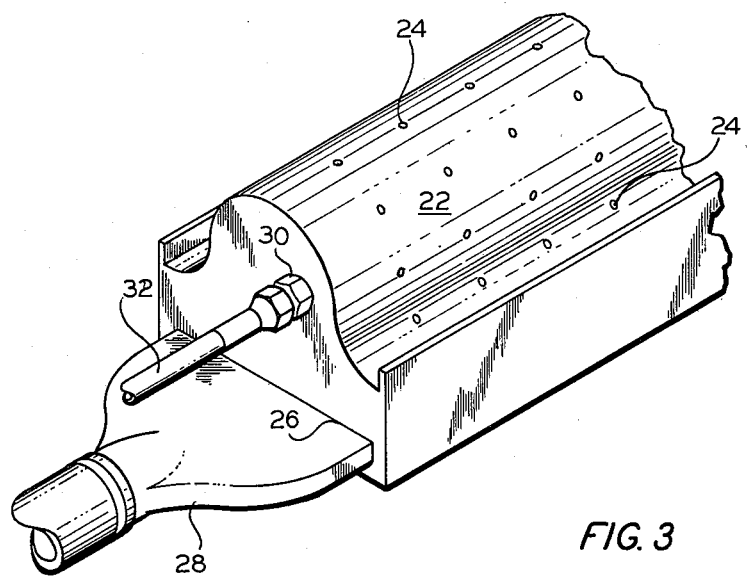
FIG. 3 shows another embodiment of means for forming a thermoplastic shape in accordance with the present invention.

FIG. 3 of the drawings is an isometric view of another embodiment in accordance with the present invention. In accordance with FIG. 3, an elongated form 22, having an upper contour complimentary to the contour of the lower surface of thermoplastic shape 2 of FIG. 1, along which the thermoplastic shape is drawn. Formed through the upper surface of form 22 are air apertures 24, of the same character as those shown in FIG. 1, which are connected to an elongated internal air channel 26, again similar to that of FIG. 2. Mounted on the end of air channel 26 is fixture 28, which in turn is connected to an appropriate source of vacuum (not shown). In this particular embodiment, a portion of the cooling of the thermoplastic shape is provided by interconnected cooling medium channels in the interior of form 22. Water is supplied to the innerconnected channels through water inlet 30 with appropriate fixture 32 connected thereto and leading to a source of water supply. Obviously, a water outlet would be formed in the opposite end of form 22. In this particular instance, as in the use of the forming means of FIG. 2, the thermoplastic shape is fed to form 22 from an appropriate profile die and sizing sleeve (not shown). In this particular embodiment, it is to be noted that the top surface of the plastic shape to be formed is at least partially cooled by atmospheric air, rather than water or other cooling medium as in the embodiment of FIG. 2. However, it should be recognized that the embodiment of FIG. 3 could also be mounted in an appropriate cooling medium bath in the same manner as the form of FIG. 2. Also, as in the embodiment of FIG. 2, the embodiment of FIG. 3 could have appropriate taps into the main air and water channels to vary the cooling along the length of the form. Also, as in the embodiment of FIG. 2, the vacuum drawn on form 22 serves the same multiple purposes, and in particular, cools a plastic shape having two open sides in a manner to prevent warping and shrinking.

While the present invention has been described in connection with specific structures and modes of operation, it is to be understood that these are by way of illustration only and variations, modifications and equivalents thereof will be readily apparent to one skilled in the art.

We claim:

1. A method of cooling and solidifying a thermoplastic shape having two open sides comprising:
    (a) continuously moving said thermoplastic shape, in its at least partially molten state, along an elongated form having a contour complementary to the contour of one side of said two open sides of said thermoplastic shape;
    (b) simultaneously with moving said thermoplastic shape, drawing a gaseous vacuum through said form and apertures therein in communication with said one side of said two open sides of said thermoplastic shape in a manner to maintain intimate contact between said one side of said thermoplastic shape and said form along the entire length of said form; and
    (c) simultaneously with said moving of said thermoplastic shape and said drawing a vacuum, at least partially cooling said form by at least one of (1) circulating a liquid cooling medium through said form separately from said vacuum and (2) circulating a liquid cooling medium through a bath of said liquid cooling medium in contact with at least that side of said form opposite the side in contact with said thermoplastic shape;

(d) the other of said open sides of said thermoplastic shape being exposed to one of (1) atmospheric air and (2) at least a portion of said liquid cooling medium in said bath.

2. A method in accordance with claim 1 wherein the liquid cooling medium is water.

3. A method in accordance with claim 1 wherein the thermoplastic shape is at least partially cooled by circulating the liquid cooling medium through the form.

4. A method in accordance with claim 1, 2, or 3, wherein the thermoplastic shape is a shape formed from high density polyethylene.

5. A method in accordance with claim 1 wherein the thermoplastic shape is at least partially cooled by circulating the liquid cooling medium through the bath.

6. A method in accordance with claim 1 wherein the thermoplastic shape is at least partially cooled by circulating the liquid cooling medium through the form and by circulating the liquid cooling medium through the bath.

7. Apparatus for cooling and solidifying a thermoplastic shape having two open sides comprising:
(a) an elongated form having a contour complementary to the contour of one side of said thermoplastic shape and adapted to have said thermoplastic shape in at least a partially molten state continuously moved therealong;
(b) means for drawing a gaseous vacuum through said form and apertures therein in communication with said one side of said two open sides of said thermoplastic shape simultaneously with the movement of said thermoplastic shape therealong and adapted to maintain intimate contact between said one side of said thermoplastic shape and said form along the entire length of said form; and
(c) means for at least partially cooling said form simultaneously with said movement of said thermoplastic shape therealong and the drawing of a vacuum through said form; including, at least one of (1) means for circulating a liquid cooling medium through said form separately from said vacuum and (2) means for circulating a liquid cooling medium through a bath in contact with at least that side of said form opposite the side in contact with said thermoplastic shape;
(d) the other of said open sides of said thermoplastic shape being exposed to one of (1) atmospheric air and (2) at least a portion of said liquid cooling medium in said bath.

8. Apparatus in accordance with claim 7 wherein the means for at least partially cooling the form is means for circulating a liquid cooling medium through said form.

9. Apparatus in accordance with claim 7 wherein the means for at least partially cooling the form is means for circulating a liquid cooling medium through a bath in contact with at least that side of said form opposite the side in contact with the thermoplastic shape.

10. Apparatus in accordance with claim 7 wherein the means for at least partially cooling the form includes means for circulating a liquid cooling medium through said form and means for circulating a liquid cooling medium through the bath in contact with at least that side of said form opposite the side in contact with the thermoplastic shape.

* * * * *